United States Patent
Andrews et al.

(10) Patent No.: US 8,684,499 B2
(45) Date of Patent: Apr. 1, 2014

(54) METHOD FOR FORMING AN APERTURE AND ACTUATOR LAYER FOR AN INKJET PRINTHEAD

(75) Inventors: John R. Andrews, Fairport, NY (US); Thomas E. Orlowski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 361 days.

(21) Appl. No.: 12/890,234

(22) Filed: Sep. 24, 2010

(65) Prior Publication Data
US 2012/0076980 A1    Mar. 29, 2012

(51) Int. Cl.
*B41J 2/04*    (2006.01)

(52) U.S. Cl.
USPC .................................. 347/54; 347/20; 347/63

(58) Field of Classification Search
USPC .................. 347/20, 40, 54, 56, 61–65, 67–68, 347/70–71
See application file for complete search history.

(56) References Cited

U.S. PATENT DOCUMENTS

| | | |
|---|---|---|
| 4,864,329 A | 9/1989 | Kneezel et al. |
| 5,686,224 A | 11/1997 | O'Neill |
| 5,950,309 A | 9/1999 | Bryce et al. |
| 6,139,674 A | 10/2000 | Markham et al. |
| 6,183,064 B1 | 2/2001 | Murthy et al. |
| 6,199,980 B1 | 3/2001 | Fisher et al. |
| 6,568,794 B2 * | 5/2003 | Yamanaka et al. ............... 347/54 |
| 6,779,877 B2 | 8/2004 | Andrews |
| 6,789,886 B2 | 9/2004 | Andrews et al. |
| 6,811,238 B2 * | 11/2004 | Shingyohuchi ................. 347/68 |
| 7,254,890 B2 * | 8/2007 | Barnes et al. .................... 347/54 |
| 7,275,817 B2 | 10/2007 | Clark et al. |
| 7,571,992 B2 * | 8/2009 | Jia et al. .......................... 347/70 |
| 2007/0008377 A1 | 1/2007 | Jia et al. |
| 2010/0116423 A1 | 5/2010 | Reitmeier |

* cited by examiner

*Primary Examiner* — Juanita D Jackson
(74) *Attorney, Agent, or Firm* — Maginot Moore & Beck, LLP

(57) ABSTRACT

A method enables multiple inkjet printhead dies to be manufactured by bonding a single wafer to a single polymer layer. Multiple die sites on the single wafer are arranged in a predetermined pattern that corresponds to the pattern in which a plurality of aperture arrays are arranged in the polymer layer. The die sites on the wafer and the aperture arrays in polymer layer are aligned, the wafer and polymer layer are bonded, and the bonded wafer and polymer layer are cut to form a plurality of inkjet printhead dies.

11 Claims, 6 Drawing Sheets

METHOD FOR FORMING AN APERTURE AND ACTUATOR LAYER FOR AN INKJET PRINTHEAD

TECHNICAL FIELD

This disclosure relates generally to methods for manufacturing components used in inkjet printheads, and more particularly, to methods for fabricating composite layers used in inkjet printheads.

BACKGROUND

Micro-electromechanical systems (MEMS) are mechanical systems that are micromachined in silicon and may be optionally integrated with control electronic circuits. MEMS are generally categorized as either microsensor or microactuator systems, depending on the application. MEMS incorporate electrostatic, electromagnetic, thermoelastic, piezoelectric, or piezoresistive effects in the operations of the systems.

One use for MEMS devices is in drop on demand inkjet technology that has been employed in commercial products, such as printers, plotters, and facsimile machines. Generally, an inkjet image is formed by the selective activation of inkjets within a printhead to eject ink onto an ink receiving member. To facilitate manufacture of an inkjet array printhead, an array of inkjet ejectors can be formed from multiple laminated plates or sheets. These sheets are configured with arrays of ink droplet ejectors. Each ejector may include structures such as an actuator, pressure chamber, outlet, and aperture nozzle. These structures are formed from the superposition of the multiple laminated structural layers. An example of a laminated layer inkjet array for a printhead includes a silicon layer bonded to an aperture layer formed on a polymer material, such as polyimide or thermoplastic. The silicon layer includes an array of actuators. Each actuator has an associated ink inlet, diaphragm, and pressure chamber area. The polymer aperture layer includes an aperture in the form of a nozzle. Walls are formed on the silicon layer to for a pressure chamber for each operator and the polymer aperture layer is bonded to the walls to enclose the pressure chamber and establish fluid communication between each aperture in the aperture layer and each pressure chamber formed on the silicon layer. Once formed, each actuator in the array of actuators may be selectively activated to deform the diaphragm and expel an ink droplet from the pressure chamber through the aperture.

The process for bonding the polymer aperture plate to the walls extending from the silicon layer requires alignment of the apertures in the aperture layer with the silicon layer. Existing manufacturing processes produce actuator arrays by forming a plurality of actuator arrays on a silicon wafer and then cutting the silicon wafer to separate the actuator arrays from one another. The inlets, diaphragms, and walls are then formed on the actuator arrays and the polymer aperture plate is bonded to the walls extending from the silicon plate. Known methods of aligning apertures in an aperture plate to actuators and their associated structure on the silicon layer often result in alignment errors of at least five microns in magnitude. Increased efficiencies and improved precision in alignment in the manufacture of the MEMS printheads would be beneficial to the fields of imaging in general, and inkjet printing in particular.

SUMMARY

An improved method for manufacturing components useful for inkjet printheads has been developed. The method includes forming a plurality of die sites on a wafer in a predetermined pattern, forming a plurality of aperture arrays on a polymer layer, aligning the die sites on the wafer with the aperture arrays on the polymer layer, bonding the wafer and the polymer layer together; and cutting the bonded wafer and the polymer layer to form a plurality of bonded dies. Each die site includes an array of inkjet actuators and each aperture array includes a plurality of apertures. The plurality of aperture arrays are arranged in a pattern corresponding to the predetermined pattern of the die sites on the wafer and the polymer layer has a size and a shape corresponding to a size and a shape of the wafer.

In at lease one embodiment, a multi-layered structure suitable for use in manufacturing inkjet printheads includes a wafer having a plurality of die sites arranged in a predetermined pattern, and a polymer layer that includes a plurality of aperture arrays arranged in a predetermined pattern corresponding to the predetermined pattern of the plurality of die sites on the wafer. The polymer layer and wafer are bonded together to enable each actuator in each array of actuators formed in each die site on the wafer to be aligned with an aperture in a corresponding aperture array formed in the polymer layer.

In at least another embodiment, a multi-layered structure suitable for use in manufacturing inkjet printheads includes a wafer having a plurality of die sites arranged in a predetermined pattern, an array of actuators arranged on a surface of each die site of the wafer, an array of fluid chambers positioned over each array of actuators in each die site on the wafer, and a polymer layer including a plurality of aperture arrays arranged in a predetermined pattern corresponding to the predetermined pattern of the plurality of die sites on the wafer. Each actuator in each array of actuators includes a flexible membrane. Each fluid chamber in the array of fluid chambers is formed above a membrane in the array of actuators. Each aperture array on the polymer layer has a plurality of apertures with each aperture placed in fluid communication with a corresponding fluid chamber in each die site on the wafer, and the polymer layer and wafer are bonded together.

DETAILED DESCRIPTION OF THE DRAWINGS

Figure 1A:
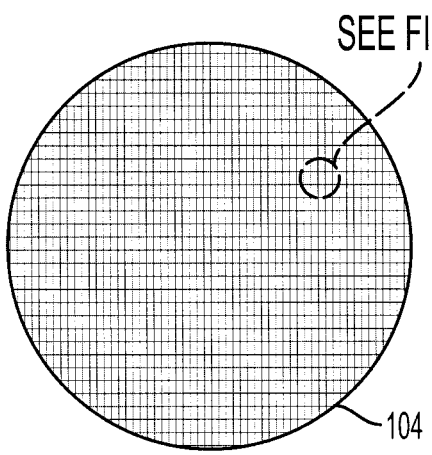
FIG. 1A is an illustration of a wafer having multiple die sites.

The description below and the accompanying figures provide a general understanding of the environment for the system and method disclosed herein as well as the details for the system and method. In the drawings, like reference numerals are used throughout to designate like elements. As used herein, the term "wafer" refers to a planar material sheet adapted to have multiple repeated instances of a structural pattern formed on and through the surface of the wafer. A common example of a wafer is a silicon wafer used in the fabrication of microelectronics and micro electro-mechanical system (MEMS) devices. Common examples of these wafers have approximately circular shapes with diameters between 25 mm and 450 mm and thicknesses of approximately 275 µm to 950 µm. While the wafer is often primarily composed of a silicon substrate, wafers may also include planar layers of other materials, such as metals. Selected regions of a wafer may include chemicals diffused into the wafer substrate in a process known as doping. While wafers with silicon substrates are widely used in industry, other materials, including metallic crystals formed from elements of the III-V group in the periodic table, may also be used to form wafers. A photoresist material, which is typically a polymeric material, may optionally cover a wafer substrate. A positive photoresist material becomes soluble to chemical solvents in response to exposure to radiation. A negative photoresist material becomes insoluble to chemical solvents once exposed to radiation, typically actinic radiation. One example of a negative photoresist commonly used in microfluidic applications is SU-8, a polymer that may coat a wafer in thicknesses ranging between about 0.1 micrometers and 2 millimeters. As used herein, a "microfluidic structure" may refer to a variety of channels, passageways, openings, or chambers formed in one or more layers of material adapted to transport and hold a quantity of fluid such as ink. Typical microfluidic structures have dimensions ranging from about 500 microns to less than 1 micron in size. Photolithographic techniques may be used to pattern and etch structures, such as microfluidic channels and chambers, into photoresist materials as well as the underlying wafer. Various deposition techniques including vapor deposition, sputtering, spin coating, plating, and other techniques known to the art may also form structures, including microfluidic channels and chambers, on the surface of the underlying wafer. As used herein, the term "die site" refers to a defined section disposed within a larger layer of material. The layer is typically a wafer, and each die site contains one or more structures that remain intact after a die site is cut from the layer. A plurality of die sites are formed on a wafer, and each die site includes one instance of a structural pattern formed on the wafer. A wafer is typically formed with a plurality of die sites arranged in a pattern, such as a two dimensional grid. An inter-die region separates the die sites to enable cutting of each die site from the layer without damaging the structures in the die site. Die sites often have rectangular shapes with the same structure repeated in each die site on a layer in many common embodiments.

A wafer 104 having multiple die sites that are arranged in a grid pattern is shown in FIG. 1A. Two die sites 108A and 108B are shown in the magnified view of FIG. 1B. Each die site includes ten actuators 112 having open pressure chambers formed over them. The actuators and pressure chambers are arranged in an array having two rows with each row having five actuators and pressure chambers. An ink inlet 128 that is etched through the wafer 104 in each die site enables an external fluid source to be coupled to the pressure chambers. Inter-die region 110 separates die site 108A from die site 108B. The remaining die sites are similarly separated. Thus, cutting through the inter-die regions 110 of the wafer 104 separates the die sites from one another. Each separated piece of the wafer that contains an actuator array is called a die, and the cutting process may be referred to as "dicing" the wafer. While not a requirement, die sites on a wafer typically have uniform dimensions, and each die site contains a single actuator array structure similar to the ones contained in the other die sites. The predetermined pattern used to arrange the die sites is typically a two-dimensional grid, although alternative die site patterns may be used.

Figure 1B:
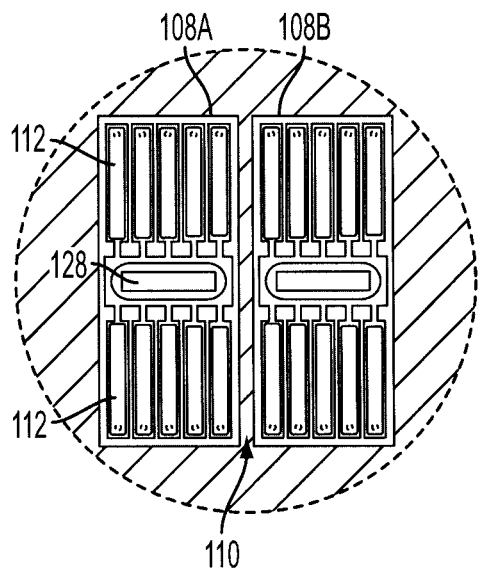
FIG. 1B is a more detailed view of two die sites in the wafer of FIG. 1A, each die site having an actuator array and a pressure chamber formed over each actuator in the array.

Various techniques known to the art may be used to form the actuator arrays and pressure chambers at the die sites shown in FIG. 1A and FIG. 1B. Multiple iterations of material depositions, patterning operations, and etching processes may be performed to form an actuator array and pressure chamber at each die site of the wafer 104. The techniques used to implement these depositions, operations, and processes are well known. The microfluidic structures formed on the wafer may be made with photoresist materials, metallic depositions, and other materials applied to the wafer. The structures formed by these materials and techniques include channels that enable fluid to flow through the microfluidic structures, walls that form cavities for pressure chambers, and openings that enable fluid to enter the wafer from an external source. Electrostatic actuators, electromechanical actuators, such as piezoelectric elements, or thermal actuators may be mounted to the surface of the silicon wafer. The plurality of actuator arrays and microfluidic structures of each die site are arranged in a predefined pattern to form a portion of a printhead to be used in an inkjet printer.

Figure 1C:
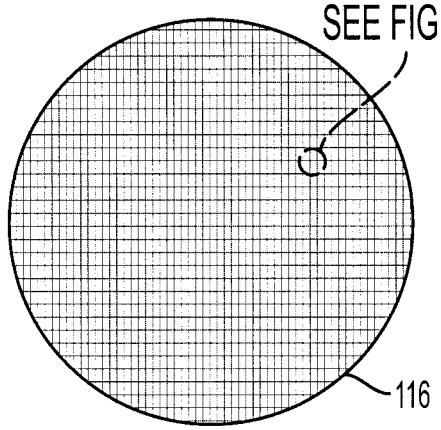
FIG. 1C is an illustration of a polymer film having multiple aperture arrays.
Figure 1D:
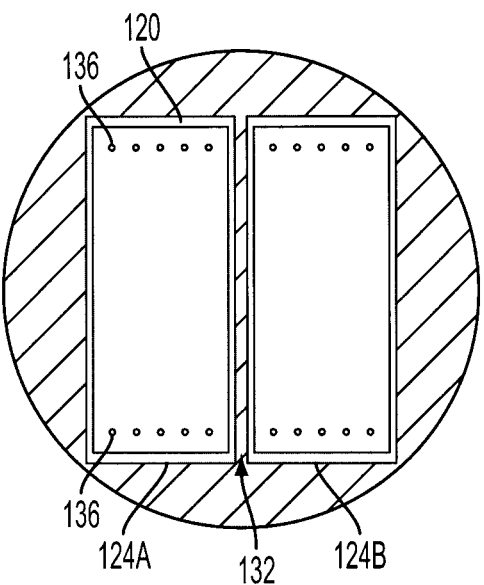
FIG. 1D is a more detailed view of two aperture arrays formed in the polymer film of FIG. 1C.

A polymer layer 116 that has been prepared for bonding to the wafer 104 to cover the microfluidic structures constructed on the layer is shown in FIG. 1C. The polymer film is typically a plate or a sheet of a polymer, such as a polyimide or thermoplastic, cut to approximately the same shape and size as the wafer 104. The polymer film may include a single layer, or multiple layers that incorporate adhesive layers for bonding with the wafer, and an optional anti-wetting coating on an outward facing surface of the polymer film. Polymer film layer 116 has a size and shape corresponding to wafer 104. A plurality of aperture arrays are arranged in a grid pattern that corresponds to the die site grid pattern in wafer 104. FIG. 1D shows a magnified view of two aperture arrays 124A and 124B in polymer film 116. Each aperture array includes ten apertures 136 that are arranged in two rows with each row having five apertures. Region 132 separates the aperture array 108A from aperture array 108B. The remaining aperture arrays are similarly separated. Each aperture array is positioned at a location that corresponds to an actuator array die site in wafer 104.

Figure 2:
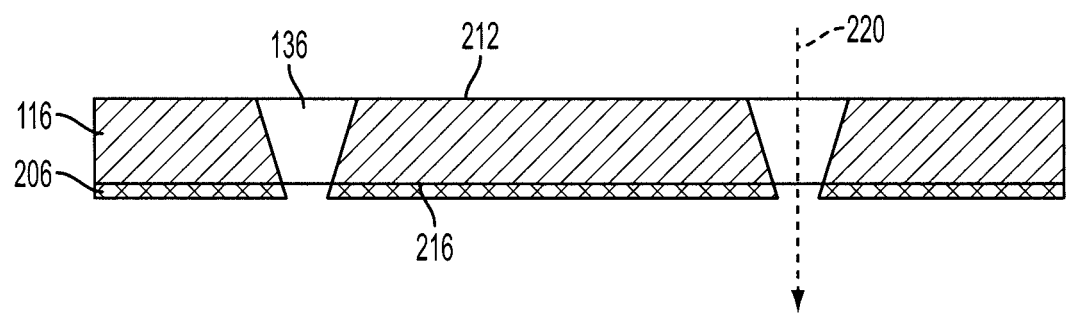
FIG. 2 is a cross-sectional view of a polymer layer showing two of the apertures in one aperture array.

The apertures are formed in the polymer layer 116 using various techniques, which include laser ablation. An example of a laser ablation technique includes ablating an aperture in the layer 116 with an excimer laser. A cross-sectional view of the layer 116 is shown in FIG. 2. In the example embodiment of FIG. 2, an excimer laser ablates apertures from the bonding surface 212 towards the exterior surface 216 as indicated by arrow 220. The laser is controlled in a known manner to form a plurality of aperture arrays having apertures 136 with the tapered shape depicted in FIG. 2. The surface 212 of layer 116 is configured to bond to the structures on the wafer that form the pressure chambers. Surface 216 of the layer 116 has been covered with an antiwetting coating 206 that is deposited on polymer layer 116 prior to ablation of the layer to form the apertures. The antiwetting coating 206 resists adhesion of ink to the exposed surface of the aperture layer during printing operations.

Figure 3:
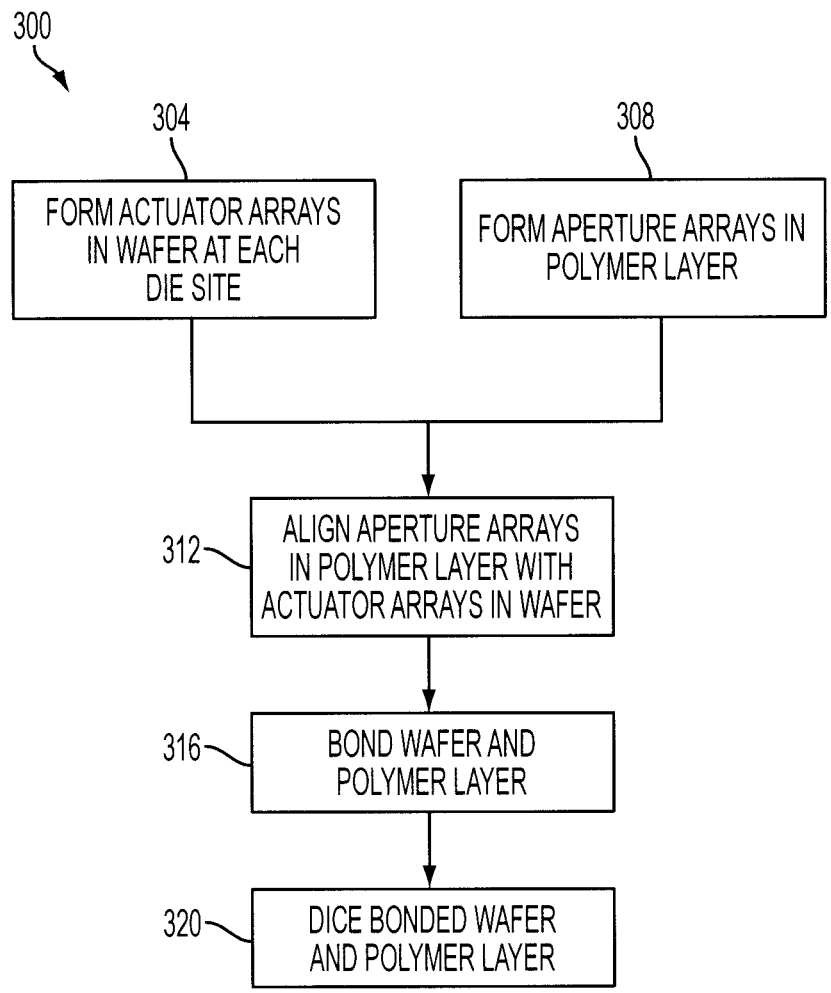
FIG. 3 is a flow diagram of a batch process for producing multiple dies, each die having an actuator array and aligned apertures.

FIG. 3 depicts a process 300 that forms multiple dies for the manufacture of inkjet printheads. Process 300 begins with the construction of microfluidic structure on a silicon wafer (block 304) and the formation of the apertures in the aperture arrays on the polymer layer (block 308). The die sites one the wafer are then aligned with the aperture arrays on the polymer film (block 312). The alignment may be facilitated with alignment features that were formed in the circumference of the wafer and the polymer layer during the processes performed in blocks 304 and 308. The alignment process places each aperture in the polymer film layer in fluid communication with a corresponding pressure chamber on the wafer. Following the alignment, the polymer layer is bonded to the wafer (block 316). After the bonding process is completed, the bonded wafer and polymer layer may be cut, or diced, into individual actuator array and aperture plate dies (block 320).

The bonding of the wafer and the polymer layer may be achieved with a thin layer of epoxy interposed between the polymer layer and bonding surfaces on the wafer. A suitable epoxy for the bonding process includes Epon® epoxy, as well as alternative adhesives including phenolic, polyimide, and acrylic adhesive layers. The example bonding process includes the application of heat and pressure to the wafer and polymer film layers. The heat and pressure may cause an uneven thermal expansion between the wafer and the polymer layer. This uneven expansion may place stress on the wafer and cause the wafer to crack. To address this uneven expansion and reduce the risk of wafer cracking, gaps, such as the gap 120 shown in FIG. 1D, may be included in the layer 116 to separate the aperture arrays in the polymer layer. The gaps provide an area between each aperture array where the polymer layer may expand while reducing stress applied to the wafer.

Figure 4A:
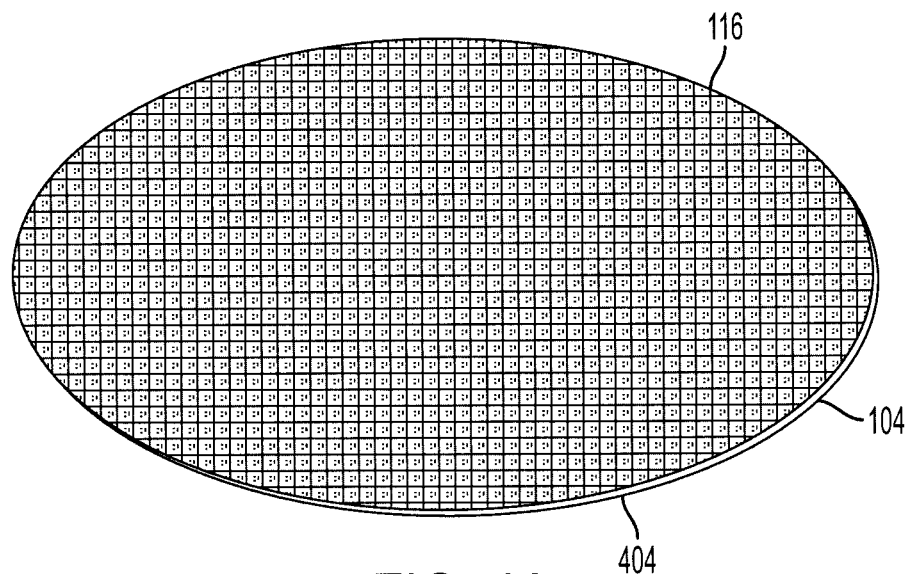
FIG. 4A is a perspective view of the polymer layer of FIG. 1C bonded to the silicon wafer of FIG. 1A.
Figure 4B:
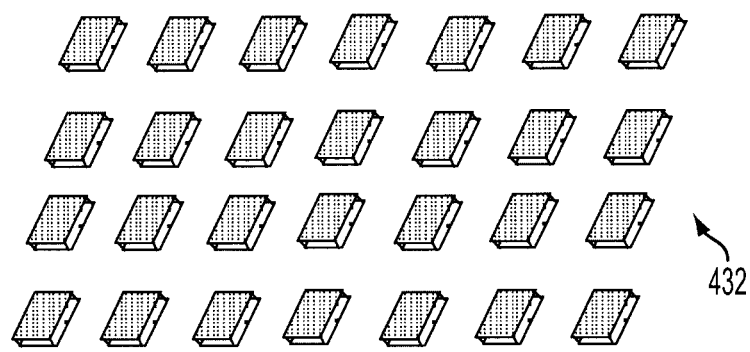
FIG. 4B is a perspective view of the bonded wafer and polymer layer of FIG. 4A separated into multiple dies.

After the wafer and the polymer film have been bonded together, they form a multi-layered composite wafer such as the composite wafer 404 shown in FIG. 4A. In that figure, the polymer film 116 has been aligned and bonded to the underlying silicon wafer 104. Each aperture array in the polymer film 116 is adequately aligned with a corresponding pressure chamber in a die site in the wafer 104 to enable each aperture in the polymer layer to be in fluid communication with a pressure chamber overlying an actuator in an actuator array at each die site on the wafer 404. This bonded composite wafer may then be cut along the inter-die regions of the wafer 104 to form the bonded dies 432 shown in FIG. 4B. Typical dicing methods include cutting along the inter-die regions with a mechanical saw or a laser cutter. Thus, the process of FIG. 3 is an efficient method for manufacturing dies for inkjet printheads. The process 300 may produce bonded dies 432 having alignment errors between each aperture and pressure chamber of less than one micron in magnitude.

Figure 5:
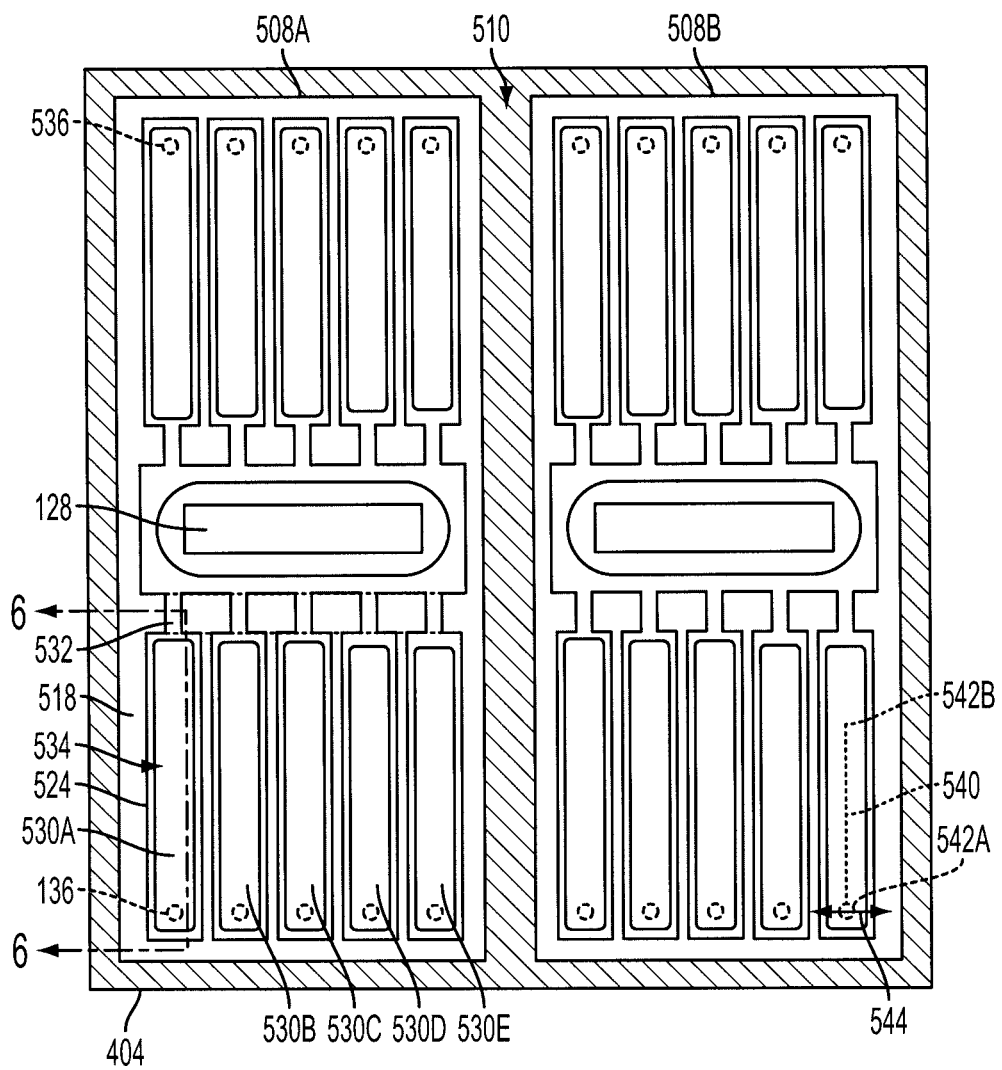
FIG. 5 is a plan view of two inkjet ejector arrays formed in a wafer.

A portion of the bonded composite wafer 404 is shown in FIG. 5. Each aperture 136 (shown in phantom in the figure) is aligned with a pressure chamber, such as 530A, that overlies an actuator 524 in an actuator array. The inter-die region 510 separates one bonded die site 508A from the other bonded die site 508B. In the example of FIG. 5, a microfluidic channel 532 in wafer 404 enables fluid communication between the inlet 128 and one of the pressure chambers overlying one of the actuators. Rigid walls 518 that extend vertically from the wafer 404 form walls of one or more pressure chambers. These walls help hold fluid received from the inlet 128 in the pressure chambers overlying the actuators and the flexible membranes that respond to the actuators. The flexible membranes 530A-530E may be formed from a polysilicon material, or alternatively from SU-8 polymer or other silicon layers.

The term "alignment" as used in this document to describe the relationship of an aperture to a pressure chamber in a bonded composite wafer refers to the position of each aperture in an aperture array with reference to a longitudinal axis, shown by axis 540, placed between walls 518 of a corresponding actuator area in an actuator array. Longitudinal axis 540 bisects each actuator area 524 between walls 518, although actuator embodiments with different geometries may have different alignment axes. The actual position of the center of an aperture after the bonding process is completed may differ from the aligned positions along axis 540. An alignment error describes the difference in position from the center of the actual position of the aperture from the aligned positions on longitudinal axis 540, indicated by arrows 544. An aperture with a sufficiently large alignment error prevents ink in a pressure chamber from being ejected through an aperture during operation of a printhead. Alignment errors may also refer to the difference in position between the center of an aperture with respect to the ends 542A and 542B of the longitudinal axis 540.

Figure 6:
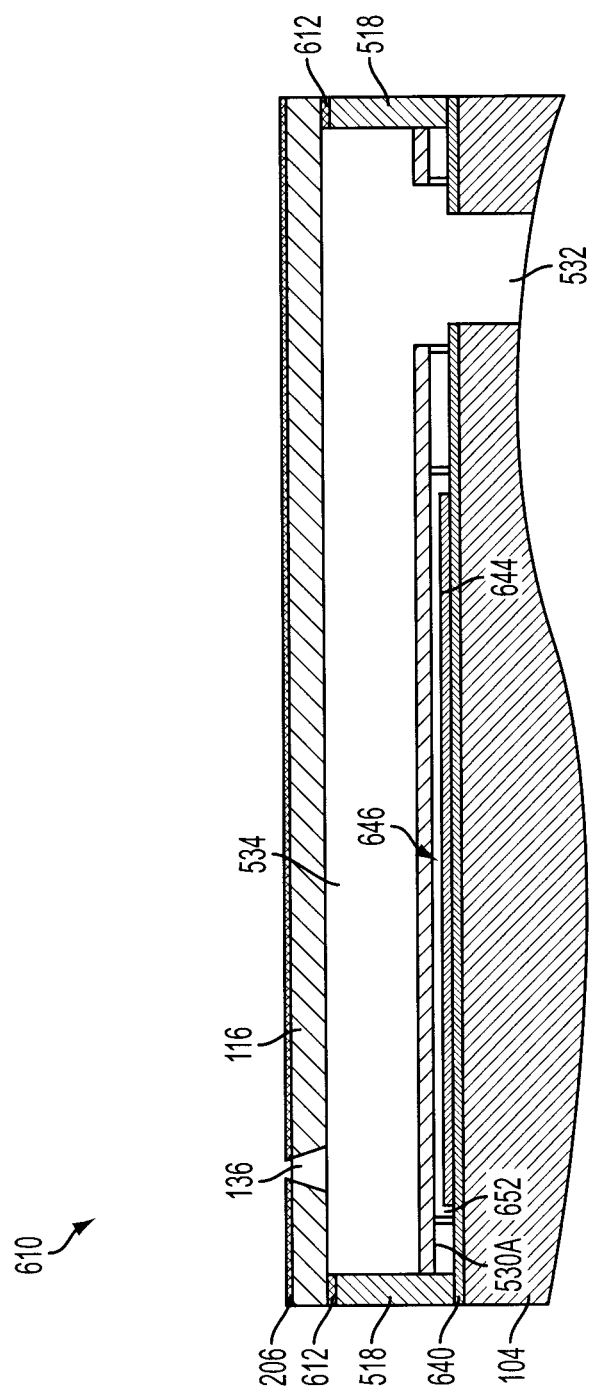
FIG. 6 is a cross-sectional view of an inkjet ejector on one die along the cross-sectional lines for FIG. 6 shown in FIG. 5.

FIG. 6 depicts a single actuator, pressure chamber, and aperture assembly 610 taken along a cross-sectional view from FIG. 5. Actuator assembly 610 includes silicon substrate in wafer 104, actuator 646, pressure chamber 534, and intermediate layers, such as flexible membrane 530A and rigid walls 518. Bonded polymer aperture layer 116 overlies pressure chamber 534 and includes antiwetting coating 206. An optional adhesive 612 aids in bonding the aperture layer 116 to the exposed top surfaces of rigid walls 518. One or more insulating layers 640 may also be deposited on the wafer substrate 104. The insulating layer 640 may comprise silicon dioxide and silicon nitride. A conductive layer, comprising polysilicon in FIG. 6, forms a bottom electrode 644 in actuator 646. The diaphragm 530A and electrode 644 form an actuator 646 that may eject ink through aperture 136. The actuator 646 also includes a cavity 652 formed between membrane 530A and electrode 644. Cavity 652 provides space for diaphragm 530A to deflect towards and away from electrode 644. Although the example embodiment of FIG. 6 employs an electrostatic actuator, devices incorporating a piezoelectric actuator, thermal actuator, or any other actuator suitable for ejecting ink drops may be used.

The structure of a bonded and separated die site operates in a printhead in the following manner. The inlet 128 (FIG. 5) receives fluid from a fluid reservoir (not shown) and enables the fluid to flow from inlet 128 through channel 532 to the pressure chamber 534 over the actuator 646. An electrical signal activates an actuator electrode 644 to cause the diaphragm 530A to move towards the actuator electrode, although other types of excitation may be used to actuate other types of actuators. This deflection expands the volume of fluidic chamber 534 and decreases the pressure in the chamber 534 so fluid flows through ink inlet 128 into the pressure chamber 534. In response to the activation signal returning to an inactive state, the actuator membrane 530A returns to an equilibrium position. This action urges a portion of the fluid in the pressure chamber 534 through aperture 136. In inkjet embodiments, the fluid may be liquid ink that is ejected from aperture 136 in the form of a drop. A completed printhead may incorporate one or more of the bonded dies produced by process 300.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A multi-layered structure suitable for use in manufacturing inkjet printheads comprising:
a wafer including a plurality of die sites arranged in a predetermined pattern, each die site including a plurality of actuators and a plurality of flexible membranes, each flexible membrane being comprised essentially of a polysilicon material and the flexible membranes in the plurality of flexible membranes being positioned adjacent the actuators in the plurality of actuators in a one-to-one correspondence, and a plurality of walls extending from a surface of the wafer about each flexible membrane to a position above each flexible membrane so the walls about each flexible membrane and the flexible membranes form a plurality of fluid cavities with each fluid cavity in the plurality of fluid cavities being positioned over each actuator in the plurality of actuators in a one-to-one correspondence; and
a polymer layer having a size and a shape of the wafer, the polymer layer including a plurality of aperture arrays arranged in a predetermined pattern corresponding to the predetermined pattern of the plurality of die sites on the wafer, each aperture array having a plurality of apertures, the polymer layer and the wafer being bonded together to enable each actuator and each fluid cavity positioned over each actuator in each plurality of actuators formed in each die site on the wafer to be aligned with an aperture in a corresponding aperture array formed in the polymer layer.

2. The multi-layered structure of claim 1, wherein each actuator in each plurality of actuators is positioned to urge ink through a corresponding aperture in each plurality of apertures.

3. The multi-layered structure of claim 1, the wafer being primarily composed of silicon.

4. The multi-layered structure of claim 1 further comprising:
an inter-die region that separates the die sites in the plurality of die sites on the wafer from one another; and
a corresponding region that separates the aperture arrays in the plurality of aperture arrays in the polymer layer from one another.

5. The multi-layered structure of claim 1 wherein the polymer layer is bonded to the walls at a top surface of each wall.

6. The multi-layered structure of claim 5 further comprising:
an adhesive layer positioned between the top surface of each wall and the polymer layer.

7. A multi-layered structure suitable for use in manufacturing inkjet printheads comprising:
a wafer including a plurality of die sites arranged in a predetermined pattern;
an array of actuators arranged on a surface of each die site of the wafer, each actuator in each array of actuators having a flexible membrane positioned adjacent to each actuator, the flexible membrane being comprised essentially of polysilicon;
an array of fluid chambers positioned about each flexible membrane in each die site on the wafer; and
a single polymer layer including a plurality of aperture arrays arranged in a predetermined pattern corresponding to the predetermined pattern of the plurality of die sites on the wafer, each aperture array on the polymer layer having a plurality of apertures with each aperture in each aperture array being placed in fluid communication with a corresponding fluid chamber in each die site on the wafer, and the polymer layer and wafer being bonded together.

8. The multi-layered structure of claim 7, each actuator in each array of actuators being positioned to urge ink through a corresponding aperture in each array of apertures.

9. The multi-layered structure of claim 7 further comprising:
an inter-die region that separates the die sites in the plurality of die sites on the wafer from one another; and
a corresponding region on the polymer layer that separates the aperture arrays in the plurality of aperture arrays in the polymer layer from one another.

10. The multi-layered structure of claim 7, each die site on the wafer further comprising:
a plurality of walls extending from the surface of each die site on the wafer to a position above the flexible membranes, the walls and flexible membranes forming the array of fluid chambers at each die site.

11. The multi-layered structure of claim 10 wherein the polymer layer is bonded to the walls at a top surface of each wall.

* * * * *